United States Patent
Takehara et al.

(10) Patent No.: US 9,654,723 B2
(45) Date of Patent: *May 16, 2017

(54) RECORDING APPARATUS, REPRODUCING APPARATUS, RECORDING AND REPRODUCING APPARATUS, RECORDING METHOD, REPRODUCING METHOD, RECORDING AND REPRODUCING METHOD, AND RECORD MEDIUM

(71) Applicant: Sony Corporation, Tokyo (JP)

(72) Inventors: Mitsuru Takehara, Tokyo (JP); Yoichiro Sako, Tokyo (JP); Toshiro Terauchi, Tokyo (JP)

(73) Assignee: Sony Corporation, Tokyo (JP)

( * ) Notice: Subject to any disclaimer, the term of this patent is extended or adjusted under 35 U.S.C. 154(b) by 50 days.

This patent is subject to a terminal disclaimer.

(21) Appl. No.: 14/574,939

(22) Filed: Dec. 18, 2014

(65) Prior Publication Data

US 2015/0104150 A1    Apr. 16, 2015

Related U.S. Application Data

(63) Continuation of application No. 11/919,266, filed as application No. PCT/JP2007/057934 on Apr. 4, 2007, now Pat. No. 8,945,008.

(30) Foreign Application Priority Data

Apr. 5, 2006 (JP) ................................ 2006-104263

(51) Int. Cl.
G06F 19/00 (2011.01)
H04N 5/765 (2006.01)
(Continued)

(52) U.S. Cl.
CPC ....... *H04N 5/765* (2013.01); *G06F 17/30017* (2013.01); *G06F 17/30032* (2013.01);
(Continued)

(58) Field of Classification Search
CPC combination set(s) only.
See application file for complete search history.

(56) References Cited

U.S. PATENT DOCUMENTS 5,604,809 A   2/1997  Tsubonuma et al.
5,676,138 A   10/1997 Zawilinski
(Continued)

FOREIGN PATENT DOCUMENTS

CN   1244012 A   2/2000
CN   1424722 A   6/2003
(Continued)

OTHER PUBLICATIONS

Magalhaes et al., "Using MPEG standards for multimedia customization," Signal Processing, May 2004, pp. 437-456, vol. 19, No. 5, Elsevier Science Publishers, Amsterdam, NL.
(Continued)

*Primary Examiner* — William Thomson
*Assistant Examiner* — Shirley Jian
(74) *Attorney, Agent, or Firm* — Wolf, Greenfield & Sacks, P.C.

(57) ABSTRACT

Changes of a user's emotion that occurs when content is reproduced and a user's surrounding environment that occurs when the content is reproduced are recorded as sensing meta data and content is reproduced in a reproducing mode corresponding to the recorded sensing meta data. Content supplied from a content providing section 11 is normally reproduced. A human body sensor 24 measures biological information of a user of content. An environmental sensor 25 measures a user's surrounding environment. A
(Continued)

sensing meta data generating section 19 generates sensing meta data using information detected by at least one of the human body sensor 24 and the environmental sensor 25. A recording processing section 20 records the generated sensing meta data to a record medium 21. A reproducing processing section 23 reproduces sensing meta data. A reproducing control section 12 reproduces content in a reproducing mode that changes corresponding to the reproduced sensing meta data.

19 Claims, 7 Drawing Sheets

(51) Int. Cl.
    *G06F 17/30*    (2006.01)
    *G11B 27/10*    (2006.01)
    *G11B 27/32*    (2006.01)
    *H04N 9/82*    (2006.01)
    *H04N 21/41*    (2011.01)
    *H04N 21/4147*    (2011.01)
    *H04N 21/422*    (2011.01)
    *H04N 21/44*    (2011.01)
    *G11B 27/30*    (2006.01)
    *H04N 9/804*    (2006.01)
    *H04N 9/806*    (2006.01)

(52) U.S. Cl.
    CPC ........ *G06F 17/30044* (2013.01); *G11B 27/10* (2013.01); *G11B 27/30* (2013.01); *G11B 27/322* (2013.01); *H04N 9/8205* (2013.01); *H04N 9/8233* (2013.01); *H04N 21/4122* (2013.01); *H04N 21/4147* (2013.01); *H04N 21/42201* (2013.01); *H04N 21/42202* (2013.01); *H04N 21/44* (2013.01); *G06F 2203/011* (2013.01); *H04N 9/8042* (2013.01); *H04N 9/8063* (2013.01)

(56) References Cited

U.S. PATENT DOCUMENTS

| | | | |
|---|---|---|---|
| 5,725,472 A | 3/1998 | Weathers | |
| 5,875,108 A | 2/1999 | Hoffberg et al. | |
| 5,941,711 A | 8/1999 | Iida et al. | |
| 6,001,065 A | 12/1999 | DeVito | |
| 6,023,512 A | 2/2000 | Matsuo et al. | |
| 6,270,077 B1 | 8/2001 | Cohen | |
| 6,343,180 B1 | 1/2002 | Kim | |
| 6,584,053 B1 | 6/2003 | Tsukihashi | |
| 6,597,375 B1 | 7/2003 | Yawitz | |
| 6,607,484 B2 | 8/2003 | Suzuki et al. | |
| 6,623,427 B2 | 9/2003 | Mandigo | |
| 6,847,778 B1 | 1/2005 | Vallone et al. | |
| 7,290,698 B2 | 11/2007 | Poslinski et al. | |
| 7,648,366 B1 | 1/2010 | Poulsen | |
| 7,716,153 B2 | 5/2010 | Vemuri | |
| 7,716,572 B2 | 5/2010 | Beauregard et al. | |
| 7,761,427 B2 | 7/2010 | Martin et al. | |
| 8,112,474 B2 | 2/2012 | Miyoshi et al. | |
| 8,176,118 B2 | 5/2012 | Nagasaka et al. | |
| 8,249,427 B2 | 8/2012 | Nagasaka et al. | |
| 8,350,804 B1* | 1/2013 | Moll ....................... | G06F 3/015 341/21 |
| 8,386,925 B2 | 2/2013 | Nagasaka et al. | |
| 8,438,197 B2 | 5/2013 | Miyoshi et al. | |
| 8,553,037 B2 | 10/2013 | Smith et al. | |
| 8,861,933 B2 | 10/2014 | Hattori et al. | |
| 8,862,781 B2 | 10/2014 | Nagasaka et al. | |
| 8,914,389 B2 | 12/2014 | Nagasaka | |
| 8,945,008 B2 | 2/2015 | Takehara et al. | |
| 2002/0034145 A1 | 3/2002 | Takeishi et al. | |
| 2002/0041692 A1 | 4/2002 | Seto et al. | |
| 2002/0083448 A1 | 6/2002 | Johnson | |
| 2002/0120925 A1 | 8/2002 | Logan | |
| 2003/0020744 A1 | 1/2003 | Ellis et al. | |
| 2003/0028273 A1 | 2/2003 | Lydecker et al. | |
| 2003/0067554 A1 | 4/2003 | Klarfeld et al. | |
| 2003/0093784 A1 | 5/2003 | Dimitrova et al. | |
| 2003/0159569 A1 | 8/2003 | Ohta | |
| 2004/0003706 A1 | 1/2004 | Tagawa et al. | |
| 2004/0052505 A1 | 3/2004 | Ahmad et al. | |
| 2004/0244568 A1 | 12/2004 | Nakabo et al. | |
| 2005/0001727 A1 | 1/2005 | Terauchi et al. | |
| 2005/0145099 A1 | 7/2005 | Lengeling et al. | |
| 2005/0172788 A1 | 8/2005 | Yamamoto | |
| 2005/0228785 A1 | 10/2005 | Wolcott et al. | |
| 2005/0289582 A1 | 12/2005 | Tavares et al. | |
| 2006/0009702 A1 | 1/2006 | Iwaki et al. | |
| 2006/0045470 A1 | 3/2006 | Poslinski et al. | |
| 2006/0127041 A1 | 6/2006 | Shimizu | |
| 2007/0180432 A1 | 8/2007 | Gassner et al. | |
| 2007/0238934 A1 | 10/2007 | Viswanathan | |
| 2007/0239847 A1 | 10/2007 | Takehara et al. | |
| 2007/0297755 A1 | 12/2007 | Holt et al. | |
| 2008/0063361 A1 | 3/2008 | Saito | |
| 2008/0114714 A1 | 5/2008 | Vemuri | |
| 2008/0195980 A1 | 8/2008 | Morris | |
| 2008/0235268 A1 | 9/2008 | Miyoshi et al. | |
| 2008/0235356 A1 | 9/2008 | Miyoshi et al. | |
| 2008/0259745 A1 | 10/2008 | Sako et al. | |
| 2008/0310267 A1 | 12/2008 | Hattori et al. | |
| 2008/0316879 A1 | 12/2008 | Sako et al. | |
| 2009/0048494 A1 | 2/2009 | Takehara et al. | |
| 2009/0106261 A1 | 4/2009 | Nagasaka et al. | |
| 2009/0119273 A1 | 5/2009 | Nagasaka et al. | |
| 2009/0297128 A1 | 12/2009 | Nagasaka et al. | |
| 2009/0299823 A1 | 12/2009 | Nagasaka et al. | |
| 2009/0299981 A1 | 12/2009 | Nagasaka et al. | |
| 2009/0300036 A1 | 12/2009 | Nagasaka | |
| 2010/0007665 A1 | 1/2010 | Smith et al. | |
| 2012/0117191 A1 | 5/2012 | Miyoshi et al. | |
| 2012/0185566 A1 | 7/2012 | Nagasaka et al. | |
| 2013/0132387 A1 | 5/2013 | Nagasaka et al. | |
| 2014/0316192 A1* | 10/2014 | de Zambotti ......... | A61M 21/02 600/28 |

FOREIGN PATENT DOCUMENTS

| | | |
|---|---|---|
| CN | 1692438 A | 11/2005 |
| EP | 0276948 A2 | 8/1988 |
| EP | 1211690 A2 | 11/2001 |
| EP | 1195764 A2 | 4/2002 |
| EP | 1308956 A1 | 4/2003 |
| EP | 1389012 A1 | 2/2004 |
| EP | 1457984 A2 | 2/2004 |
| EP | 1587100 A1 | 10/2005 |
| EP | 1653469 A1 | 5/2006 |
| GB | 2370954 A | 7/2002 |
| GB | 2386978 A | 10/2003 |
| JP | 01-307061 A | 12/1989 |
| JP | 02-123567 A | 5/1990 |
| JP | 02-223299 A | 9/1990 |
| JP | 02-295400 A | 12/1990 |
| JP | 03-205659 A | 9/1991 |
| JP | 03-239100 A | 10/1991 |
| JP | 04-306100 A | 10/1992 |
| JP | 06-139704 | 5/1994 |
| JP | 06-215482 A | 8/1994 |
| JP | 06-327089 A | 11/1994 |
| JP | 07-134892 A | 5/1995 |
| JP | 08-180652 A | 7/1996 |
| JP | 09-114475 | 5/1997 |
| JP | 10-63281 A | 3/1998 |
| JP | 10-304313 A | 11/1998 |
| JP | 10-322651 A | 12/1998 |
| JP | 11-24682 A | 1/1999 |
| JP | 11-213630 | 8/1999 |
| JP | 2000-029482 A | 1/2000 |
| JP | 2000-268047 A | 9/2000 |
| JP | 2001-005497 A | 1/2001 |

(56) References Cited

FOREIGN PATENT DOCUMENTS

| | | | |
|---|---|---|---|
| JP | 2001-292407 A | 10/2001 | |
| JP | 2002-091464 A | 3/2002 | |
| JP | 2002-095100 A | 3/2002 | |
| JP | 2002-150664 A | 5/2002 | |
| JP | 2002-165300 A | 6/2002 | |
| JP | 2002-170330 A | 6/2002 | |
| JP | 2002-236768 A | 8/2002 | |
| JP | 2002-244657 A | 8/2002 | |
| JP | 2002-261884 A | 9/2002 | |
| JP | 2002-298555 A | 10/2002 | |
| JP | 2002-304197 A | 10/2002 | |
| JP | 2002-344904 | 11/2002 | |
| JP | 2002-344907 A | 11/2002 | |
| JP | 2003-114949 A | 4/2003 | |
| JP | 2003-122378 A | 4/2003 | |
| JP | 2003-186777 | 7/2003 | |
| JP | 2003-202875 A | 7/2003 | |
| JP | 2003-255955 A | 9/2003 | |
| JP | 2003-256363 A | 9/2003 | |
| JP | 2003-259265 A | 9/2003 | |
| JP | 2003-263179 A | 9/2003 | |
| JP | 2003-303488 A | 10/2003 | |
| JP | 2003-317451 A | 11/2003 | |
| JP | 2004-505349 A | 2/2004 | |
| JP | 2005-038352 A | 2/2005 | |
| JP | 2005-056205 A | 3/2005 | |
| JP | 2005-128884 A | 5/2005 | |
| JP | 2005-130235 A | 5/2005 | |
| JP | 2005-166206 A | 6/2005 | |
| JP | 2005-259251 A | 9/2005 | |
| JP | 2006-086823 A | 3/2006 | |
| WO | WO 99/21164 A1 | 4/1999 | |
| WO | WO 03/096175 A1 | 11/2003 | |
| WO | WO 2005/008668 A1 | 1/2005 | |

OTHER PUBLICATIONS

U.S. Appl. No. 11/631,534, filed Feb. 11, 2008, Sako et al.
U.S. Appl. No. 11/662,313, filed Jun. 30, 2008, Miyajima et al.
U.S. Appl. No. 11/729,460, filed Mar. 29, 2007, Takehara et al.
U.S. Appl. No. 11/899,091, filed Sep. 4, 2007, Saito et al.
U.S. Appl. No. 11/919,266, filed Oct. 25, 2007, Takehara et al.
U.S. Appl. No. 12/077,557, filed Mar. 20, 2008, Miyoshi et al.
U.S. Appl. No. 12/077,645, filed Mar. 20, 2008, Miyoshi et al.
U.S. Appl. No. 12/156,910, filed Jun. 5, 2008, Hattori et al.
U.S. Appl. No. 12/247,606, filed Oct. 20, 2008, Nagasaka et al.
U.S. Appl. No. 12/263,619, filed Nov. 3, 2008, Nagasaka et al.
U.S. Appl. No. 12/475,900, filed Jun. 1, 2009, Nagasaka et al.
U.S. Appl. No. 12/476,325, filed Jun. 2, 2009, Nagasaka et al.
U.S. Appl. No. 12/476,342, filed Jun. 2, 2009, Nagasaka et al.
U.S. Appl. No. 12/476,653, filed Jun. 2, 2009, Nagasaka et al.
U.S. Appl. No. 13/349,918, filed Jan. 13, 2012, Miyoshi et al.
U.S. Appl. No. 13/432,677, filed Mar. 28, 2012, Nagasaka et al.
U.S. Appl. No. 13/743,843, filed Jan. 17, 2013, Nagasaka et al.
U.S. Appl. No. 14/472,280, filed Aug. 28, 2014, Nagasaka et al.
U.S. Appl. No. 14/491,273, filed Sep. 19, 2014, Miyoshi et al.
U.S. Appl. No. 14/491,341, filed Sep. 19, 2014, Miyoshi et al.
U.S. Appl. No. 14/538,248, filed Nov. 11, 2014, Nagasaka et al.
International Search Report and Written Opinion mailed Oct. 18, 2005 in connection with International Application No. PCT/JP2005/015414.
Japanese Office Action issued Aug. 9, 2006 in connection with Japanese Application No. 2005-38582.
Japanese Office Action issued Nov. 8, 2006 in connection with Japanese Application No. 2005-38582.
Japanese Office Action issued Oct. 9, 2007 in connection with Japanese Application No. 2004-207025.
European Search Report dated Feb. 12, 2008 in connection with European Application No. 05780938.6.
Supplementary European Search Report issued Mar. 7, 2008 in connection with European Application No. 05755889.2.
Japanese Office Action issued Apr. 8, 2008 in connection with Japanese Application No. 2004-207025.
Japanese Office Action dated Apr. 15, 2008 in connection with Japanese Application No. 2006-104264.
Japanese Office Action issued Jul. 8, 2008 in connection with Japanese Application No. 2006-244569.
Japanese Office Actions issued Aug. 5, 2008 and Nov. 11, 2008 in connection with Japanese Application No. 2006-104263.
Japanese Office Action issued Jan. 14, 2009 in connection with Japanese Application No. 2005-38582.
Summons to Attend Oral Proceedings mailed Apr. 6, 2009 in connection with European Application No. 05780938.6.
Japanese Office Action issued May 7, 2009 in connection with Japanese Application No. 2005-38582.
Chinese Office Action issued Jun. 19, 2009 in connection with Chinese Application No. 200710096855.9.
European Search Report issued Sep. 15, 2010 in connection with European Application No. 07741370.6.

* cited by examiner

Fig. 2

| ID OF USER A | |
|---|---|
| VALUE OF HEART RATE (BEATS/MINUTE) | TIME AT WHICH HEART RATE WAS MEASURED (YEAR, MONTH, DAY, HOUR, MINUTE, SECOND) |
| 72 | 2006-2-3 20:47:10 |
| 75 | 2006-2-3 20:47:30 |
| 71 | 2006-2-3 20:47:50 |
| ⋮ | ⋮ |
| 72 | 2006-2-3 21:52:10 |
| 82 | 2006-2-3 21:52:30 |
| ⋮ | ⋮ |

Fig. 3

| REPRODUCING POSITION (HOUR, MINUTE, SECOND) | TIME AT WHICH PARTICULAR POSITION WAS REPRODUCED (YEAR, MONTH, DAY, HOUR, MINUTE, SECOND) |
|---|---|
| 00:15:20 | 2006-2-3 20:47:10 |
| 00:15:40 | 2006-2-3 20:47:30 |
| 00:16:00 | 2006-2-3 20:47:50 |
| ⋮ | ⋮ |
| 01:20:20 | 2006-2-3 21:52:10 |
| 01:20:40 | 2006-2-3 21:52:30 |
| ⋮ | ⋮ |

Fig. 4

| ID OF USER A | |
|---|---|
| VALUE OF HEART RATE (BEATS/MINUTE) | REPRODUCING POSITION (HOUR, MINUTE, SECOND) |
| 72 | 00:15:20 |
| 75 | 00:15:40 |
| 71 | 00:16:00 |
| ⋮ | ⋮ |
| 72 | 01:20:20 |
| 82 | 01:20:40 |
| ⋮ | ⋮ |

DESCRIPTION OF REFERENCE NUMERALS

| | |
|---|---|
| 1 | RECORDING AND REPRODUCING APPARATUS |
| 11 | CONTENT PROVIDING SECTION |
| 12 | REPRODUCING CONTROL SECTION |
| 19 | SENSING META DATA GENERATING SECTION |
| 20 | RECORDING PROCESSING SECTION |
| 21 | RECORD MEDIUM |
| 23 | REPRODUCING PROCESSING SECTION |
| 24 | HUMAN BODY SENSOR |
| 25 | ENVIRONMENTAL SENSOR |
| S1 | START PROCESS OF REPRODUCING CONTENT. |
| S2 | START SENSING. |
| S3 | GENERATE SENSING META DATA. |
| S4 | PERFORM PROCESS OF RECORDING SENSING META DATA. |
| S11 | PERFORM PROCESS OF OBTAINING SENSING META DATA. |
| S12 | PERFORM PROCESS OF OBTAINING CONTENT. |
| S13 | PERFORM PROCESS OF REPRODUCING CONTENT. |

RECORDING APPARATUS, REPRODUCING APPARATUS, RECORDING AND REPRODUCING APPARATUS, RECORDING METHOD, REPRODUCING METHOD, RECORDING AND REPRODUCING METHOD, AND RECORD MEDIUM

RELATED APPLICATIONS

This application is a continuation of and claims the benefit under 35 U.S.C. §120 of U.S. patent application Ser. No. 11/919,266, entitled "RECORDING APPARATUS, REPRODUCING APPARATUS, RECORDING AND REPRODUCING APPARATUS, RECORDING METHOD, REPRODUCING METHOD, RECORDING AND REPRODUCING METHOD, AND RECORD MEDIUM," filed on Oct. 25, 2007, and now pending, which is the National Stage entry of PCT/JP 2007/057934 filed on Apr. 4, 2007, which claims the benefit under 35 U.S.C. §119 of Japanese Patent Application No. 2006-104263 filed on Apr. 5, 2006, each of which is incorporated by reference in its entirety.

TECHNICAL FIELD

The present invention relates to a recording apparatus and a recording method that record sensing meta data that are sensed when content is reproduced. In addition, the present invention relates to a reproducing apparatus, a recording and reproducing apparatus, a reproducing method, and a recoding and reproducing method that reproduce content corresponding to sensing meta data recorded in a recording medium. Moreover, the present invention relates to a record medium in which sensing meta data have been recorded.

BACKGROUND ART

Additional data referred to as meta data are commonly recorded in record mediums for content such as movies, music, photos, and so forth such that the meta data are associated with the content. When content is a movie, the actors, actresses, director, year of production, plot, and so forth of the movie are recorded as meta data to a record medium. When content is music content, the title, genre, performing duration, performers, and so forth of the music are recorded as meta data to a record medium. These meta data can be reproduced independently from the content. Thus, the viewer/listener of content can easily know a feature of content using meta data.

Content of these movies, music, and so forth is generally narrative and the mental state of the viewer/listener of content changes corresponding to the story development and scenes. In other words, the mental state of the viewer/listener changes, namely he or she is surprised, impressed, disembarrassed, and/or excited corresponding to scenes of content. The changes of the mental state of the viewer/listener are expressed by changes of appearance, presence of perspiration, changes of heart rate, changes of blood pressure, and so forth. The changes of the mental state of the viewer/listener largely depend on the scenes and story development of content and so do the surrounding environment in which he or she is viewing and/or listening to content. For example, if the viewer/listener views a picture of the south pole on a hot midsummer day, he or she tends to feel comfortable. In contrast, if the viewer/listener views the same picture of the south pole on a cold midwinter day, he or she may feel uncomfortable. Thus, the mental state of the viewer/listener variously changes corresponding to scenes of content and the surrounding environment in which he or she is viewing and/or listening to content.

Japanese Patent Application Laid-Open No. 2002-344904 describes a content reproducing apparatus and so forth that measure the reactions of the viewer/listener against content being reproduced and generate evaluation values based on the measured results as well as reproduce content. The content reproducing apparatus and so forth described in Japanese Patent Application Laid-Open No. 2002-344904 change the brightness and sound level of a picture after a predetermined scene on the basis of the evaluated values.

The mental state of the user against content reproduced in the past, his or her surrounding environment, and the use mode of content depend on him or her. An impression of whether the viewer/listener was impressed or excited by a particular scene of content that he or she viewed and/or listened to just depends on him or her. The user may memorize the impression of content in association therewith. If content is reproduced at a user's memorable location, he or she may memorize the location in association with the content.

In the related art, meta data recorded in association with content are information of for example the performers, audiences, plot, and so forth added by the content production side. It is impossible to cause the changes of a user's emotion and his or her surrounding environment that occurred when content was reproduced to recur. In the content reproducing apparatus described in Japanese Patent Application Laid-Open No. 2002-344904, a reproducing mode of content is changed corresponding to a user's reaction against content being reproduced. However, this related art reference does not describe technologies of which changes of a user's emotion and his or her surrounding environment that occurs when content is reproduced are recorded as meta data.

If the mental state of the user and his or her surrounding environment that occurs when content is reproduced can be recorded as meta data in association with content, when the same content is reproduced corresponding to the meta data, the mental state and surrounding environment of the user that occurred when the content was reproduced can be caused to recur.

DISCLOSURE OF THE INVENTION

Therefore, an object of the present invention is to provide a recording apparatus and a recording method that allow changes of a user's emotion and his or her surrounding environment that occurs when content is reproduced to be recorded as sensing meta data to a record medium.

In addition, another object of the present invention is to provide a reproducing apparatus, a reproducing method, a recording and reproducing apparatus, and a recording and reproducing method that allow content to be reproduced corresponding to sensing meta data that have been recorded.

Moreover, another object of the present invention is to provide a record medium in which changes of a user's emotion and his or her surrounding environment have been recorded as sensing meta data.

The present invention is a recording apparatus, comprising a content providing section which provides content; at least one of a biological information measuring section which measures user's biological information which occurs when the content is reproduced and an environmental measuring section which measures a user's surrounding environment which occurs when the content is reproduced; a sensing meta data generating section which generates sensing meta data using information detected by at least one of the biological information measuring section and the environment measuring section; and a recording processing section which records the generated sensing meta data and the content such that they are associated with each other.

In addition, the present invention is a reproducing apparatus which reproduces provided content, comprising a reproducing processing section which reproduces sensing meta data generated using information detected by at least one of a biological information measuring section which measured user's biological information which occurred when content was reproduced and an environment measuring section which measured a user's surrounding environment which occurred when the content was reproduced from a record medium; and a reproducing controlling section which reproduces the content in a reproducing mode corresponding to the sensing meta data.

In addition the present invention is a recording and reproducing apparatus, comprising a content providing section which provides content; at least one of a biological information measuring section which measures user's biological information that occurs when the content is reproduced and an environmental measuring section which measures a user's surrounding environment which occurs when the content is reproduced; a sensing meta data generating section which generates sensing meta data using information detected by at least one of the biological information measuring section and the environment measuring section; a recording processing section which records the generated sensing meta data in association with the content; a reproducing processing section which reproduces the sensing meta data from the record medium; and a reproducing controlling section which reproduces the content in a reproducing mode corresponding to the sensing meta data.

In addition, the present invention is a recording method, comprising the steps of providing content; generating sensing meta data using information of at least one of user's biological information which occurs when the content is reproduced and user's surrounding environment which occurs when the content is reproduced; and recording the generated sensing meta data and the content such that they are associated with each other.

In addition, the present invention is a reproducing method of reproducing provided content, comprising the steps of reproducing sensing meta data generated using information of at least one of user's biological information measured when content was reproduced and a user's surrounding environment measured when the content was reproduced from a record medium; and reproducing the content in a reproducing mode corresponding to the sensing meta data.

In addition, the present invention is a recording and reproducing method, comprising the steps of providing content; generating sensing meta data using information of at least one of user's biological information which occurs when the content is reproduced and a user's surrounding environment which occurs when the content is reproduced; recording the generated sensing meta data and the content such that they are associated with each other; reproducing the sensing meta data from a record medium; and reproducing the content in a reproducing mode corresponding to the sensing meta data.

In addition, the present invention is a record medium in which sensing meta data generated using information of at least one of user's biological information measured when content was reproduced and a user's surrounding environment measured when the content was reproduced have been recorded such that the sensing meta data are associated with the content.

BEST MODES FOR CARRYING OUT THE INVENTION

Next, with reference to the accompanying drawings, an embodiment of the present invention will be described. In this specification, content is at least one of picture information and audio information. Each content is identified by an identifier (hereinafter sometimes referred to as a content ID (Identifier)). Picture information includes all types of visually recognizable information such as pictures, still images (for example photos), graphics, electronics books, text information, and so forth displayed together therewith. Audio information includes all types of acoustically recognizable information such as music, natural sounds, talking voices, and so forth. In addition, a viewer/listener who views and listens to picture content, a listener who listens to audio content, and so forth are generally referred to as the user.

Figure 1:
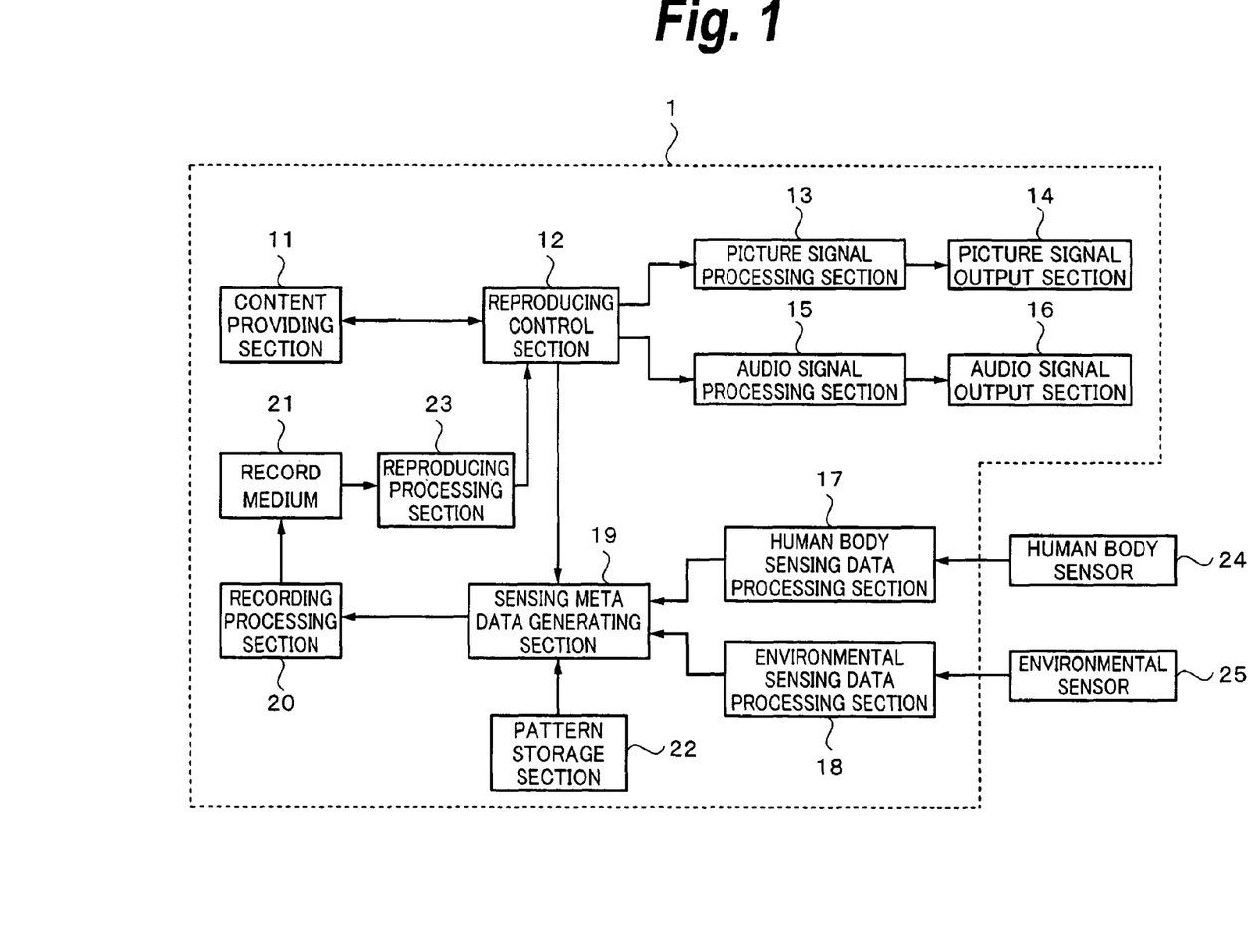
FIG. 1 is a block diagram showing a structure of a recording and reproducing apparatus according to an embodiment of the present invention.

In FIG. 1, reference numeral 1 represents a main structure of a recording and reproducing apparatus according to an embodiment of the present invention. The recording and reproducing apparatus 1 includes a content providing section 11, a reproducing control section 12, a picture signal processing section 13, a picture signal output section 14, an audio signal processing section 15, an audio signal output section 16, a human body sensing data processing section 17, an environmental sensing data processing section 18, a sensing meta data generating section 19, a recording processing section 20, a record medium 21, a pattern storage section 22, and a reproducing processing section 23.

The content providing section 11 is a record medium or a storage medium such as an optical disc (for example, a CD-ROM (Compact Disc-Read Only Memory) or a DVD-ROM (Digital Versatile Disc-Read only Memory)), a semiconductor memory, or a magnetic tape. The content providing section 11 is not limited to such a record medium or such a storage medium attachable to and detachable from the recording and reproducing apparatus 1, but may be a HDD (Hard Disk Drive) built in the recording and reproducing apparatus 1. The content providing section 11 includes a content distribution server or the like that distributes content through a television broadcast such as a ground analog/digital broadcast or a BS (Broadcasting satellite) digital broadcast or the Internet.

As will be described later, the content providing section 11 supplies content corresponding to a content ID that the user has specified and input to the reproducing control section 12.

In the normal reproducing mode, the reproducing control section 12 performs a process of reproducing content provided by the content providing section 11. The reproducing process that the reproducing control section 12 performs depends on a means that provides content. When content has been recoded on an optical disc, the reproducing control section 12 reads a signal with an optical pickup, performs a demodulating process and an error correcting process for the signal that has been read, and temporarily writes the processed signal to a buffer memory. The reproducing control section 12 performs a demultiplexing process for the signal written in the buffer memory and demultiplexes the signal, which has been multiplexed, into a picture signal and an audio signal. The demultiplexed picture signal is supplied to the picture signal processing section 13, whereas the demultiplexed audio signal is supplied to the audio signal processing section 15.

When a character signal has been recorded to an optical disc, the character signal demultiplexed by the demultiplexing process is supplied to a character signal processing section (not shown). When necessary, the character signal for which a decoding process and so forth have been performed by the processing section is superimposed with the picture signal and then the resultant signal is provided to the user.

When content is provided through a BS digital broadcast, the reproducing control section 12 performs a carrier wave selecting process for selecting a desired carrier wave from a received radio wave, a demodulating process, an error correcting process, a descrambling process, a demultiplexing process, a packet selecting process, and so forth such that a desired picture PES (Packetized Elementary Stream) and audio PES are extracted. The selected picture PES is supplied to the picture signal processing section 13, whereas the audio PES is supplied to the audio signal processing section 15. In such a manner, the reproducing control section 12 performs proper processes corresponding to the content providing section 11. Processes that the reproducing control section 12 performs may be changed.

Sensing meta data are supplied from the reproducing processing section 23 to the reproducing control section 12. Besides the normal reproducing mode, the reproducing control section 12 performs a reproducing process for content supplied from the content providing section 11 in a reproducing mode corresponding to the sensing meta data. Details of the sensing meta data will be described later.

The picture signal processing section 13 performs a process of decoding a supplied picture signal and other processes. The picture signal supplied to the picture signal processing section 13 has been compression-encoded according to for example MPEG (Moving Picture Coding Group) 2 system. Thus, the picture signal processing section 13 performs a process of decoding the picture signal that has been compression-encoded. In addition, when necessary, the picture signal processing section 13 performs a D/A (Digital to Analog) converting process of converting the decoded digital picture signal into an analog picture signal. The picture signal that has been converted into an analog signal is supplied to the picture signal output section 14.

The picture signal output section 14 is a monitor such as a CRT (Cathode Ray Tube), an LCD (Liquid Crystal Display), or an organic EL (Electro Luminescence). The picture signal output section 14 reproduces the picture signal supplied from the picture signal processing section 13.

The audio signal processing section 15 performs a process of decoding the supplied audio signal and other processes. The audio signal supplied to the audio signal processing section 15 has been compression-encoded according to for example MP3 (MPEG1-Audio Layer-III) system or MPEG2 AAC (Advanced Audio Coding) system. Thus, the audio signal processing section 15 performs a process of decoding the audio signal that has been compression-encoded. When necessary, the audio signal processing section 15 performs a D/A (Digital to Audio) converting process of converting the decoded digital audio signal into an analog signal. The audio signal that has been converted into an analog signal is supplied to the audio signal output section 16.

The audio signal output section 16 is for example a speaker or a headphone. The audio signal output section 16 reproduces the audio signal supplied from the audio signal processing section 15.

The picture signal processing section 13 and the audio signal processing section 15 decode the picture signal and the audio signal on the basis of timing information such as a DTS (Decoding Time Stamp) that has been recorded on an optical disc along with content or that has been multiplexed as a PES with a broadcast wave. In addition, since the picture signal and the audio signal are synchronized with timing information such as a PTS (Presentation Time Stamp) that has been recoded on an optical disc along with content or that has been multiplexed as a PES with a broadcast wave, the picture and sound are synchronously provided to the user.

At least one of the picture signal output section 14 and the audio signal output section 16 may be separated from the recording and reproducing apparatus 1. For example, the picture signal may be wirelessly transmitted to the picture signal output section 14 disposed independently from the recording and reproducing apparatus 1 and the picture signal may be reproduced from the picture signal output section 14.

The human body sensing data processing section 17 converts information (hereinafter, the information is sometimes referred to as human body sensing data) detected by a human body sensor 24 (that will be described later) into an electric signal and records the converted human body sensing data. In this embodiment, the human body sensing data are biological information such as electrocardiogram, breathing rate, breathing cycle, electromyogram, cerebral blood flow, brain wave, amount of perspiration, cutaneous temperature, pupil diameter, eye opening degree, limb temperature, body surface temperature, changes of appearance, and changes of blinking. Each data record of the human body sensing data is identified by the user ID of each user. The human body sensing data recorded by the human body sensing data processing section 17 are supplied to the sensing meta data generating section 19.

The environmental sensing data processing section 18 converts information (hereinafter this information sometimes referred to as environmental sensing data) detected by an environmental sensor 25 (that will be described later) into an electric signal and records the converted environmental sensing data. In this case, the environmental sensing data are at least one of temperature, humidity, airflow volume, atmospheric pressure, weather, location, and so forth. Each data record of the environmental sensing data is identified by the user ID of each user. The environmental sensing data recorded by the environmental sensing data processing section 18 are supplied to the sensing meta data generating section 19.

The sensing meta data generating section 19 generates sensing meta data using at least one of the human body sensing data and the environmental sensing data that have been supplied. The sensing meta data generating section 19 generates sensing meta data that represent the user's emotion or changes of the user's emotion that occurs when content is reproduced using for example the supplied human body sensing data. In addition, the sensing meta data generating section 19 generates sensing meta data that represent a user's surrounding environment that occurs when content is reproduced using the supplied environmental sensing meta data.

Specifically, the sensing meta data generating section 19 collates for example changes of the heart rate and changes of the appearance such as movement of the lips, blinking of eyes, and so forth obtained from the human body sensing data with data stored in the pattern storage section 22 and determines the user's emotion (joy, sadness, surprise, anger, and so forth) in a particular region of content. The sensing meta data generating section 19 generates sensing meta data that represent changes of the user's emotion in for example an XML (extensible Markup Language) format. In this embodiment, the pattern storage section 22 is preferably composed of a nonvolatile memory such as a HDD and stores emotional patterns corresponding to changes of human body sensing data. The pattern storage section 22 stores for example changes of heart rate, changes of amount of perspiration, changes of body surface temperature, and so forth of the user and patterns of the emotion such as excitement, stress, calmness, and so forth corresponding to these changes.

In addition, the sensing meta data generating section 19 can collate for example the amount of perspiration, increase rate of heart rate, and changes of diameter of pupil obtained from the human body sending data with data stored in the pattern storage section 22 and determine the user's emotion such as surprise, stress, and so forth. The sensing meta data generating section 19 generates sensing meta data that represent the determined user's emotion.

In addition, the sensing meta data generating section 19 generates sensing meta data that represent the user's surrounding environment that occurs when content is reproduced using the environmental sensing data. The sensing meta data generating section 19 generates sensing meta data that describe for example temperature, humidity, airflow amount, atmospheric pressure, and weather (fine, cloudiness, rain, snow, storm, and so forth) in the XML format. With respect to the location at which the user stays when content is reproduced, the sensing meta data generating section 19 generates information of for example latitude and longitude.

A content ID that identifies content that the reproducing control section 12 normally reproduces is supplied to the sensing meta data generating section 19. As a content ID, for example the title of content is used. The sensing meta data generating section 19 supplies the sensing meta data, user ID, and content ID to the recording processing section 20.

The recording processing section 20 performs processes of converting the supplied sensing meta data, user ID, and content ID into those in a format suitable for the record medium 21, correlating the converted sensing meta data and so forth with content, and recording the resultant data to the record medium 21. The recording processing section 20 performs a recording process corresponding to the record medium 21. The record medium 21 is a recordable optical disc or a rewritable optical disc, for example, a CD-R (Recordable), a CD-RW (Rewritable), a DVD-R, or a DVD-RW, or a magnetic tape. Instead, the record medium 21 may be a storage medium such as a semiconductor memory or a HDD built in the recording and reproducing apparatus 1.

The reproducing processing section 23 performs a process of reproducing sensing meta data recorded in the record medium 21. The reproducing processing section 23 performs a process of reproducing sensing meta data from the record medium 21 corresponding to the user ID and content ID that the user has specified and input. The reproducing processing section 23 performs a reproducing process suitable for the record medium 21. When the reproducing processing section 23 performs the reproducing process, the reproducing processing section 23 reproduces sensing meta data from the record medium 21 and supplies the reproduced sensing meta data to the reproducing control section 12.

Next, the human body sensor 24 and the environmental sensor 25 will be described. The human body sensor 24 that is an example of the biological information measurement section is a device that is worn on the body of the user of content and that measures various types of human body sensing data. Of course, the human body sensor 24 may have additional functions such as a clock function as well as the function of measuring human body sensing data. In this embodiment, the human body sensor 24 can wirelessly communicate with the recording and reproducing apparatus 1 and transmit the measured human body sensing data to the recording and reproducing apparatus 1.

The human body sensor 24 is not limited to a device worn on the body of the user of content. Examples of the human body sensor 24 include an imaging device that is disposed in the recording and reproducing apparatus 1 and that photographs the appearance of the user and an infrared thermography that measures the body surface temperature of the user.

The environmental sensor 25 that is an example of the environment measuring section is composed of a thermometer, a humidity meter, an airflow volume meter, a barometer, an imaging device (that determines the weather), and so forth. The environmental sensor 25 may be worn on the body of the user or attached to the recording and reproducing apparatus 1. The environmental sensor 25 also includes a GPS (Global Positioning System) reception terminal or the like that detects environmental sensing data that represent a location. Thus, the environmental sensor 25 can identify the location at which the user is viewing and/or listening to content with the GPS. Instead, a location registration signal that is communicated between a user's mobile phone and a base station may be received such that the location at which content is being reproduced is identified.

Next, a specific example of which sensing meta data generated by the sensing meta data generating section 19 are recorded to the record medium 21 will be described. In the following specific example, content is picture content that is supplied from the content providing section 11 and whose information changes on the time axis. The human body sensor 24 is a wristwatch type heart rate meter that has both a wristwatch function and a heart rate meter function. The human body sensor 24 measures for example the heart rate of the user as human body sending meta data. In this embodiment, the heart rate means the number of beats per minute (BPM). The heat rate measured by the human body sensor 24 is wirelessly transmitted to the recording and reproducing apparatus 1 along with the user ID that represents the user of the human body sensor 24.

In addition, it is assumed that times counted by the recording and reproducing apparatus 1 match times counted by the human body sensor 24. When the recording and reproducing apparatus 1 and the human body sensor 24 receive a radio wave that represents the standard time, times counted by the recording and reproducing apparatus 1 can be matched with times counted by the human body sensor 24. Instead, when the standard time is obtained through the Internet, times counted by the recording and reproducing apparatus 1 can be matched with times counted by the human body sensor 24.

The content providing section 11 supplies picture content. The reproducing control section 12 performs a normal reproducing process for the supplied content. The picture signal processing section 13 and the audio signal processing section 15 perform a decoding process and so forth. The picture signal output section 14 reproduces a picture. The audio signal output section 16 reproduces a sound. While the picture signal output section 14 and the audio signal output section 16 reproduce content, the human body sensor 24 measures the heart rate.

Figure 2:
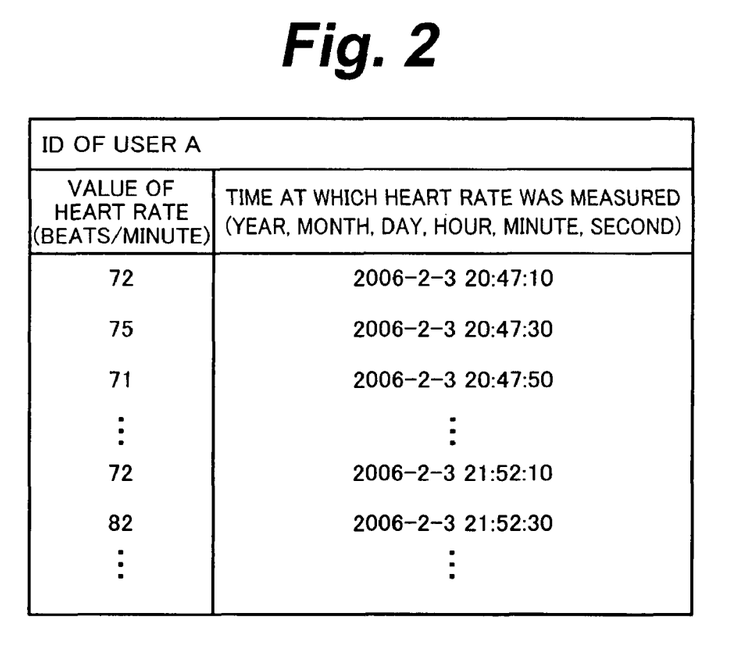
FIG. 2 is a schematic diagram showing heart rates measured by a human body sensor according to an embodiment of the present invention.

FIG. 2 shows exemplary heart rates of user A measured by the human body sensor 24. The human body sensor 24 samples the heart rates at intervals of a predetermined time period or a predetermined cycle. In addition, the human body sensor 24 counts times at which the heart rates are measured. In this example, as shown in FIG. 2, heart rate "72" was measured at time "2006-2-3 20:47:10 (in the order of year, month, day, hour, minute, second)". Other heart rates were measured in association with information of times.

The human body sensor 24 transmits the user ID that identifies user A, the heart rate of user A measured when content is reproduced in the normal reproducing mode, and information of times at which the heart rates are measured (hereinafter these information is sometimes referred to as the user ID and so forth) to the recording and reproducing apparatus 1. As the user ID, the serial number assigned to the human body sensor 24 or a number that user A has input may be used. The recording and reproducing apparatus 1 receives the user ID and so forth and supplies them to the human body sensing data processing section 17. The human body sensing data processing section 17 converts the user ID and so forth transmitted from the human body sensor 24 into an electric signal and records the converted user ID and so forth. The recorded user ID and so forth are supplied to the sensing meta data generating section 19.

Figure 3:
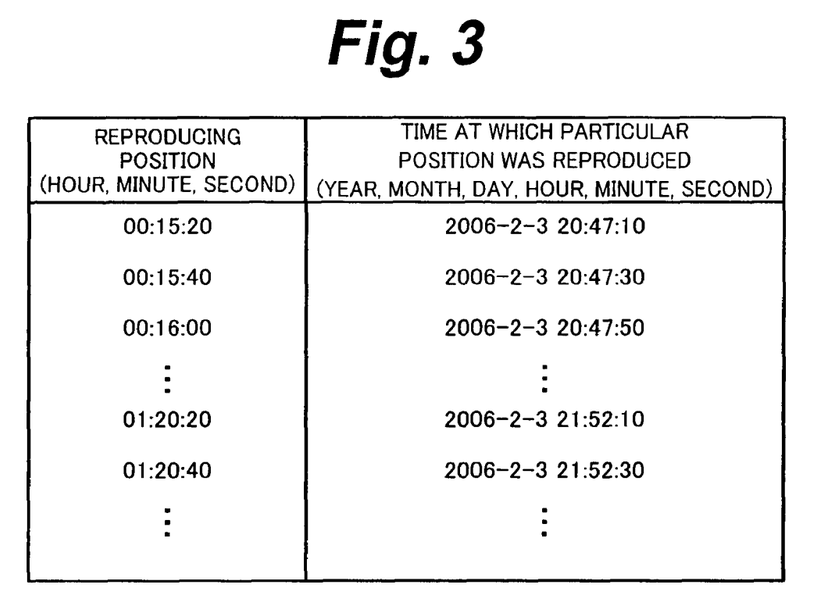
FIG. 3 is a schematic diagram showing an exemplary relationship between counted times and reproducing positions of content in the recoding and reproducing apparatus according to an embodiment of the present invention.

On the other hand, the recording and reproducing apparatus 1 can count the present time with its built-in clock circuit or the like. In addition, the reproducing control section 12 can obtain information of reproducing positions of picture content that the recording and reproducing apparatus 1 is reproducing in the normal reproducing mode. FIG. 3 shows exemplary reproducing positions of picture content corresponding to information of times that the recording and reproducing apparatus 1 is counting. For example, time "2006-2-3 20:47:10" counted by the recording and reproducing apparatus 1 corresponds to reproducing position "00:15:20" of picture content.

Figure 4:
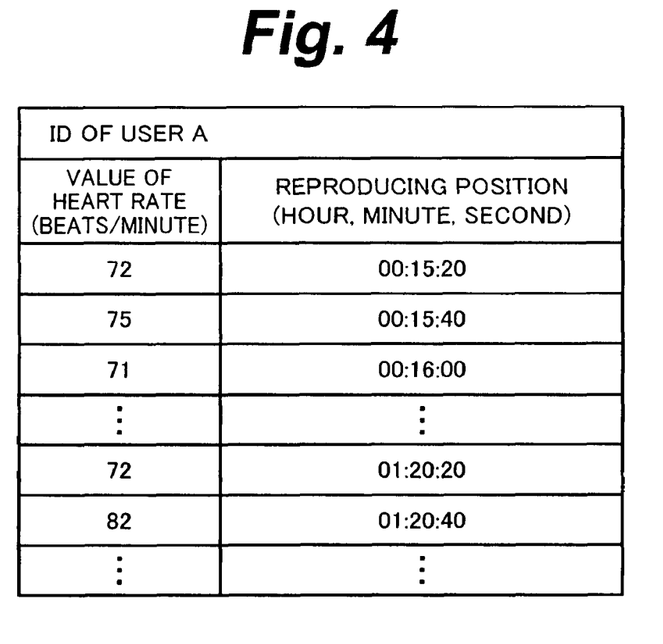
FIG. 4 is a schematic diagram showing hart rates associated with reproducing positions of content.

The sensing meta data generating section 19 determines information of times at which heart rates were measured and the reproducing positions corresponding to the information of times and associates the reproducing positions of the picture content with the measured heart rates. As described with reference to FIG. 2 and FIG. 3, the human body sensor 24 measured for example heart rate "72" and reproducing position "00:15:20" at time "2006-2-3 20:47:10". Thus, as shown in FIG. 4, reproducing position "00:15:20" of the picture content is associated with heart rate "72". Likewise, other measured heart rates are associated with reproducing positions of the picture content.

The sensing meta data generating section 19 references past patterns stored in the pattern storage section 22 and extracts a user's emotion corresponding to changes of the heart rate from the pattern storage section 22. For example, the sensing meta data generating section 19 searches past patterns stored in the pattern storage section 22 for a pattern similar to the user's emotion. The sensing meta data generating section 19 extracts an emotion corresponding to the retrieved pattern as a user's emotion that occurs when content is reproduced.

For example, in a region from reproducing position "00:15:20" to reproducing position "00:15:40" of picture content corresponding to changes of heart rate "72" to heart rate "75", since the heart rate slightly increased, it is thought that the user was excited when picture content was reproduced. In a region from reproducing position "00:15:40" to reproducing position "00:16:00" of picture content corresponding to changes of heart rate "75" to heart rate "71", since the heart rate decreased, it is thought that the user was calm when picture content was reproduced. At reproducing position "01:20:40" of picture content, since the heart rate was as high as 82, it is thought that the user was surprised.

Thereafter, the sensing meta data generating section 19 generates sensing meta data that represent the reproducing positions of picture content, the reproducing regions of picture content, and corresponding user's emotions. The sensing meta data generated by the sensing meta data generating section 19 are supplied to the recording processing section 20. In addition, the sensing meta data generating section 19 supplies the user ID that identifies user A who is a user of content reproduced in the normal reproducing mode and the content ID that identifies picture content reproduced in the normal reproducing mode to the recording processing section 20.

The recording processing section 20 converts the supplied sensing meta data, user ID, and content ID into those in a format suitable for the record medium 21. The resultant sensing meta data, user ID, and content ID that have been converted in the format suitable for the record medium 21 by the recording process of the recording processing section 20 are recorded to the record medium 21.

In the foregoing, a specific example of which sensing meta data are generated using human body sensing data such as a heart rate was described. Instead, sensing meta data may be generated using environmental sensing data. When sensing meta data are generated using environmental sensing data that represent for example temperature, humidity, airflow volume, weather, and/or location are used, it is not necessary to measure these data in the chronological order.

In addition, content such as photos whose information does not change on the time axis and meta data generated from environmental sensing data may be recorded to the record medium 21. In the process of recording sensing meta data, information of times may not be essential.

Figure 5:
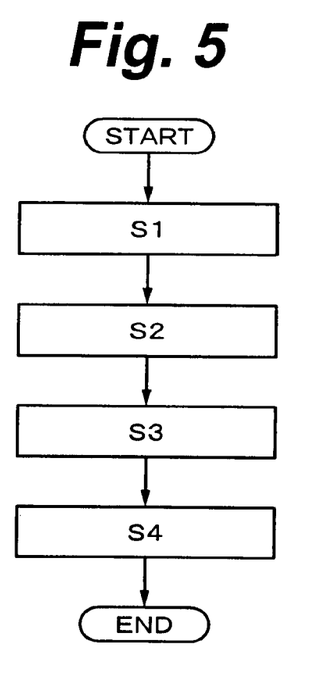
FIG. 5 is a flow chart showing a flow of a process of recording sensing meta data according to an embodiment of the present invention.

FIG. 5 is a flow chart showing a flow of a process of recording sensing meta data according to an embodiment of the present invention. In the process described with reference to FIG. 5, it is assumed that content is audio content.

At step S1, a process of reproducing content is performed. In other words, the recording processing section 12 performs a normal reproducing process for audio content supplied from the content providing section 11. The audio signal processing section 15 performs a decoding process and other processes for audio content that has been reproduced. The audio signal output section 16 reproduces audio content for the user. After the content reproducing process has been completed, the flow advances to step S2.

At step S2, the sensing process is started. In other words, at least one of user's human body sensing data that occur when content is reproduced and environmental sensing data that occur when content is reproduced are measured using at least one of the human body sensor 24 and the environmental sensor 25. The measured human body sensing data are supplied to the human body sensing data processing section 17. The measured environmental sensing data are supplied to the environmental sensing data processing section 18. At least one of the human body sensing data and environmental sensing data that have been processed by the human body sensing data processing section 17 and the environmental sensing data processing section 18 is supplied to the sensing meta data generating section 19.

It is preferred that the sensing process at step S2 be started when the reproduction of content is started. Instead, the sensing process may be started while content is being reproduced. After the sensing process has been started, the flow advances to step S3.

At step S3, the sensing meta data generating section 19 performs a process of generating sensing meta data. The sensing meta data generating section 19 generates sensing meta data using at least one of human body sensing data supplied from the human body sensing data processing section 17 and environmental sensing meta data supplied from the environmental sensing data processing section 18. When the sensing meta data have been generated, the flow advances to step S4.

At step S4, a process of recording the generated sensing meta data is performed. The sensing meta data generated at step S3 are supplied to the recording processing section 20. In addition, a user ID that identifies the user of content that is normally reproduced and a content ID that identifies content that is normally reproduced are supplied to the recording processing section 20. The recording processing section 20 converts the sensing meta data, user ID, and content ID into those in a format suitable for the record medium 21. The converted sensing meta data, user ID, and content ID are recorded to the record medium 21.

Figure 6:
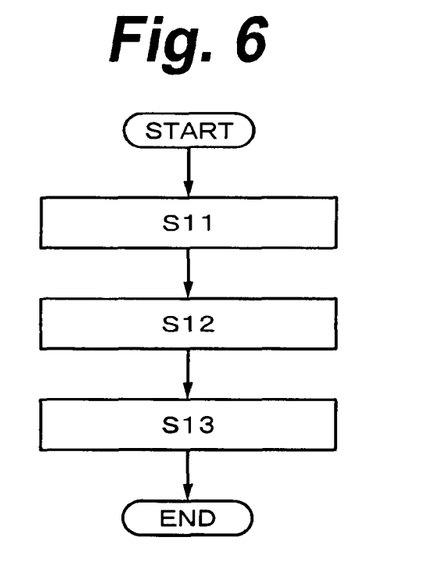
FIG. 6 is a flow chart showing a flow of a process of reproducing content corresponding to sensing meta data according to an embodiment of the present invention.
Figure 7:
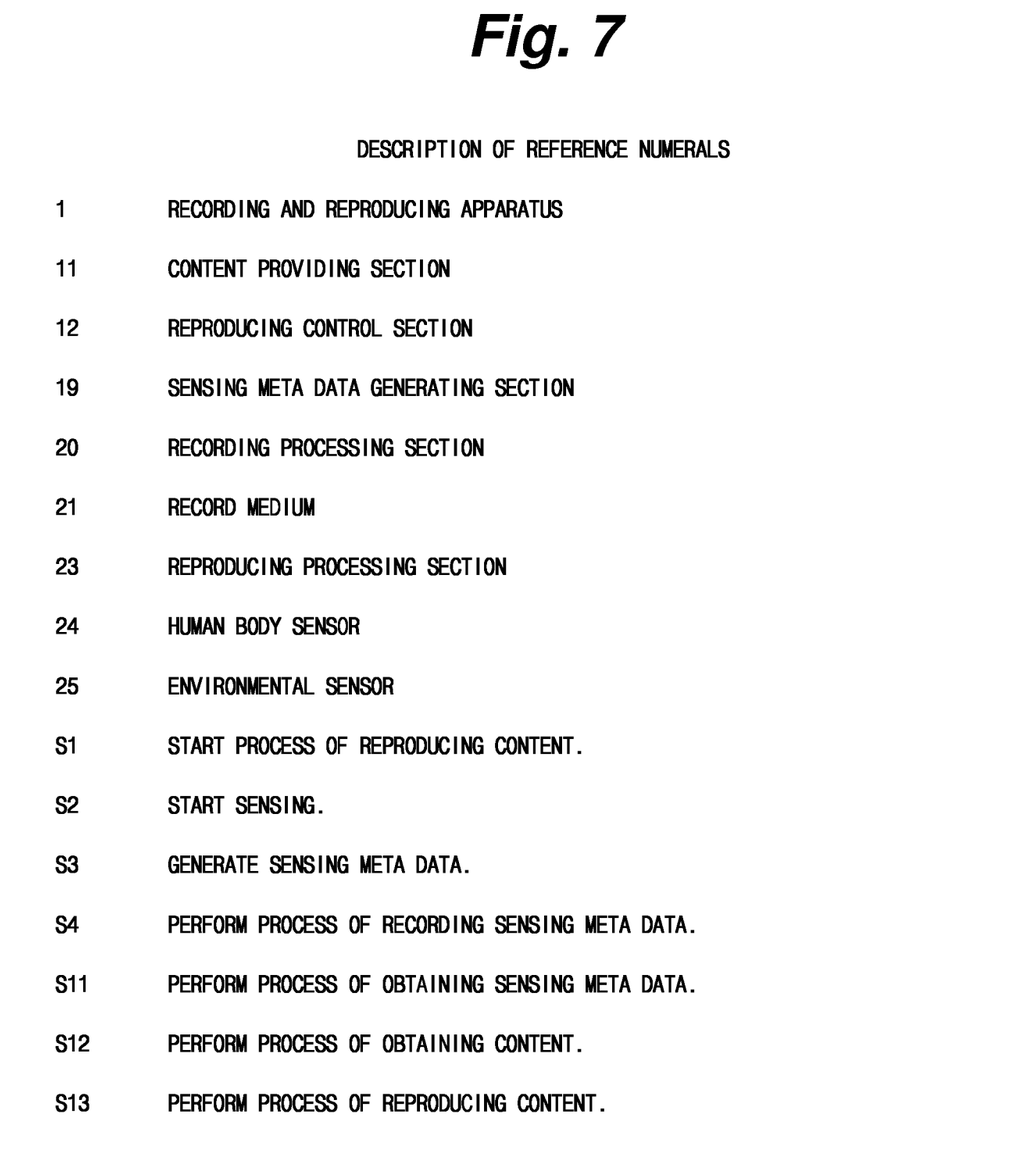
FIG. 7 is a description of the reference numerals used in FIGS. 1-6.

Next, a process of reproducing sensing meta data and so forth from the record medium 21 will be described. FIG. 6 is a flow chart showing a flow of a reproducing process according to an embodiment of the present invention.

At step S11, a process of obtaining sensing meta data is performed. For example, the user inputs a user ID and a content ID. The user ID and content ID that have been input are specified for the reproducing processing section 23. The reproducing processing section 23 reproduces sensing meta data corresponding to the specified user ID and content ID from the record medium 21. The reproduced sensing meta data are supplied to the reproducing control section 12. Thereafter, the flow advances to step S12.

At step S12, a process of obtaining content is performed. The content ID that the user has input is specified for the content providing section 11. The content providing section 11 supplies content corresponding to the specified content ID to the reproducing control section 12. For example, the content providing section 11 accesses a content distribution server and downloads content identified by the content ID therefrom. The downloaded content is supplied to the reproducing control section 12. If the content providing section 11 is not able to provide content identified by the content ID, for example the picture signal output section 14 displays an error message or the audio signal output section 16 generates an alarm sound. Thereafter, the flow advances to step S13.

At step S13, a process of reproducing content is performed. At step S13, the reproducing control section 12 performs a process of reproducing content in other than the normal reproducing mode. Namely, the reproduction control section 12 performs a process of reproducing content supplied from the content providing section 11 in a reproducing mode corresponding to sensing meta data supplied from the reproducing control section 12. Next, an example of a process of reproducing content in a reproducing mode corresponding to sensing meta data will be described.

When content is picture content, the reproducing control section 12 changes its luminance level, contrast, and/or hue corresponding to a user's emotion at a reproducing position or in a reproducing region of the picture content described in the sensing meta data. When content is audio content, the reproducing control section 12 changes its frequency characteristic and/or sound volume level and/or creates a sound effect for the audio content corresponding to a user's emotion in a particular region of the audio content described in the sensing meta data. A scene corresponding to a reproducing position of content determined to have been excited may be reproduced as a digest reproducing mode. Thus, content can be reproduced such that a scene with which a user's emotion changed is emphasized.

Picture content that has been processed by the reproducing control section 12 is supplied to the picture signal processing section 13. Audio content that has been processed by the reproducing control section 12 is supplied to the audio signal processing section 15. The picture signal processing section 13 and the audio signal processing section 15 perform a decoding process and so forth. Picture content and audio content are reproduced from the picture signal output section 14 and the audio signal output section 16, respectively, in a reproducing mode corresponding to the sensing meta data.

When sensing meta data are composed of environmental sensing meta data, the reproducing control section 12 reproduces content such that the user can recognize a surrounding environment specified by the sensing meta data.

When content is picture content, the reproducing control section 12 superimposes picture content with data that represent temperature, humidity, location, and so forth obtained from the sensing meta data. The picture signal processing section 13 performs a decoding process and so forth for the picture content superimposed with such data. The picture content for which the decoding process and so forth have been performed is output to the picture signal output section 14. At this point, the picture signal output section 14 reproduces together with the picture content the character information that represents temperature, humidity, location, and so forth that occurred when the same picture content was reproduced. Thus, the user can recognize the surrounding environment that occurred when the picture content was reproduced in the past.

When content is audio content, the reproducing control section 12 performs for example the following processes. When sensing meta data specify that the weather that occurred when audio content was reproduced in the past was rain and strong wind, the reproducing control section 12 superimposes audio content with data of sounds of rain and wind. The reproduction control section 12 supplies the audio content superimposed with data of sounds of rain and wind to the audio signal processing section 15. The audio signal processing section 15 performs a decoding process and so forth for the audio content. The audio content that has been processed is reproduced from the audio signal output section 16. At this point, when the user hears sounds of rain and wind together with the audio content, he or she can recognize his or her surrounding environment that occurred when the audio content was reproduced in the past. When the user recognizes his or her surrounding environment that occurred when the audio content was reproduced in the past, he or she can remember a memory in association with the audio content.

Instead, the reproducing control section 12 may control the content providing section 11 to download data of sounds of rain and wind through a network. The downloaded data of sounds of rain and wind are supplied from the content providing section 11 to the reproducing control section 12. The reproducing control section 12 superimposes audio content with data of sounds of rain and wind.

When sensing meta data that represent a location at which the user stayed when audio content was reproduced in the past have been recorded in the record medium 21, the audio content may be reproduced in the following manner. The reproducing control section 12 and the audio signal processing section 15 perform predetermined processes for audio content provided from the content providing section 11 or the record medium 21. The audio signal output section 16 reproduces the resultant audio content.

Sensing meta data that represent a location at which the user stayed when audio content was reproduced in the past are obtained by the reproducing process of the reproducing processing section 23. The obtained sensing data are supplied to the reproducing control section 12. The reproducing control section 12 controls the content providing section 11 to obtain data of photos of surrounding scenes for example mountains, rivers, forests, seashores, and so forth of the location at which the user stayed when audio content was reproduced in the past corresponding to the sensing meta data. For example, the reproducing control section 12 accesses a server that distributes photos to obtain data of photos of various scenes therefrom. Data of photos that have been obtained are supplied from the content providing section 11 to the reproducing control section 12.

Data of photos are supplied from the reproducing control section 12 to the picture signal processing section 13. The picture signal processing section 13 performs a decoding process and so forth. Data of photos that have been processed are supplied to the picture signal output section 14. The picture signal output section 14 reproduces scenes such as mountains, rivers, forests, seashores, and so forth. While the user is viewing scenes reproduced by the picture signal output section 14, he or she listens to audio content. Thus, the user can recognize surrounding scenes that occurred when audio content was reproduced in the past. As a result, the user can remember a memory in association with the audio content.

When content is reproduced in a reproducing mode corresponding to sensing meta data, the user can recognize changes of his or her emotion that occurred when the content was reproduced in the past. In addition, a user's surrounding environment that occurred when content was reproduced in the past can be caused to recur. Thus, the user can remember a memory in association with the content.

The processes described with reference to FIG. 5 and FIG. 6 may be structured as a recording and reproducing method of recording sensing meta data and reproducing content in a reproducing mode corresponding to the recorded sensing meta data.

Although embodiments of the present invention were specifically described, the present invention is not limited to the foregoing embodiments. Instead, various types of modifications based on the spirit of the art of the present invention may be made.

In the foregoing embodiments, the present invention was described as a recoding and reproducing apparatus. Instead, the present invention may be applied to a recording apparatus that records sensing meta data generated when content is normally reproduced. Instead, the present invention may be applied to a reproducing apparatus that reproduces content in a reproducing mode corresponding to sensing meta data recorded to a record medium.

Although a process of normally reproducing content and a process of reproducing content in a reproducing mode corresponding to sensing meta data are performed in the reproducing control section 12, they may be selected by the user.

When the content providing section 11 is a recordable or rewritable optical disc or a semiconductor memory, generated sensing meta data may be recorded to the content providing section 11.

Each means that composes an apparatus of the present invention may be structured by a dedicated hardware circuit, software, or a programmed computer. A program that describes a sequence of steps of a process may be recorded to a record medium such as a magnetic recoding device, an optical disc, an optical-magnetic disc, a semiconductor memory, or the like from which a computer can read the program.

As described above, according to the present invention, changes of a user's emotion that occur when content is reproduced and surrounding environment that occurs when content is reproduced can be recorded as sensing meta data to a record medium such as an optical disc or a semiconductor memory. When content is reproduced corresponding to sensing meta data that have been recorded, changes of a user's emotion that occurred when content was reproduced in the past and a user's surrounding environment that occurred when the content was reproduced in the past can be caused to recur. When changes of a user's emotion and a user's surrounding environment are caused to recur, he or she can remember a memory in association with content.

The invention claimed is:

1. An information processing apparatus, comprising:
circuitry configured to
reproduce first content on a first occasion,
collect first metadata based on sensed biological information of a first user and/or environmental information concerning the first user's surrounding environment, while the first content was reproduced on the first occasion, store the first metadata,
correlate one or more portions of the first content with one or more portions of the stored first metadata, and
reproduce, on a second occasion, the correlated one or more portions of the first content in a reproducing mode, whereby the reproducing mode adjusts one or more characteristics of the reproduced content depending on the one or more portions of the stored first metadata correlated with the one or more portions of the first content.

2. The apparatus of claim 1, wherein the circuitry is configured to collect the first metadata based on sensed biological information of the first user while the first content was reproduced on the first occasion.

3. The apparatus of claim 1, wherein the circuitry is configured to collect the first metadata based on environmental information concerning the first user's surrounding environment while the first content was reproduced on the first occasion.

4. The apparatus of claim 1, wherein the circuitry is further configured to correlate the one or more portions of the first content with the one or more portions of the stored first metadata by using time stamps associated with the first content and the stored first metadata.

5. The apparatus of claim 1, wherein the circuitry is further configured:
   to store information that associates the first user with the stored first metadata,
   to collect second metadata based on sensed biological information of a second user and/or environmental information concerning the second user's surrounding environment, while the first content was reproduced on the first occasion,
   to store the second metadata, and
   to distinguish the stored first metadata from the stored second metadata.

6. The apparatus of claim 1, wherein the circuitry is further configured:
   to store information that associates the first metadata with the first content,
   to reproduce second content on a second occasion,
   to collect second metadata based on sensed biological information of the first user or a second user and/or environmental information concerning the first or second user's surrounding environment, while the second content was reproduced on the second occasion,
   to store the second metadata, and
   to distinguish the stored first metadata from the stored second metadata.

7. The apparatus of claim 1, wherein the circuitry comprises a programmed computer.

8. An information processing method, comprising:
   reproducing first content on a first occasion;
   collecting first metadata based on sensed biological information of a first user and/or environmental information concerning the first user's surrounding environment, while the first content was reproduced on the first occasion; storing the first metadata;
   correlating one or more portions of the first content with one or more portions of the stored first metadata; and
   reproducing, on a second occasion, the correlated one or more portions of the first content in a reproducing mode, whereby the reproducing mode adjusts one or more characteristics of the reproduced content depending on the one or more portions of the stored first metadata correlated with the one or more portions of the first content.

9. The method of claim 8, wherein the act of collecting comprises collecting the first metadata based on sensed biological information of the first user while the first content was reproduced on the first occasion.

10. The method of claim 8, wherein the act of collecting comprises collecting the first metadata based on environmental information concerning the first user's surrounding environment while the first content was reproduced on the first occasion.

11. The method of claim 8, wherein the act of correlating further comprises correlating the one or more portions of the first content with the one or more portions of the stored first metadata by using time stamps associated with the first content and the stored first metadata.

12. The method of claim 8, further comprising:
   storing information that associates the first user with the stored first metadata;
   collecting second metadata based on sensed biological information of a second user and/or environmental information concerning the second user's surrounding environment, while the first content was reproduced on the first occasion;
   storing the second metadata; and
   distinguishing the stored first metadata from the stored second metadata.

13. The method of claim 8, further comprising:
   storing information that associates the first metadata with the first content;
   reproducing second content on a second occasion;
   collecting second metadata based on sensed biological information of the first user or a second user and/or environmental information concerning the first or second user's surrounding environment, while the second content was reproduced on the second occasion;
   storing the second metadata; and
   distinguishing the stored first metadata from the stored second metadata.

14. A non-transitory computer-readable medium encoded with instructions which, when executed by a processor, cause the processor to execute a method comprising acts of:
   reproducing first content on a first occasion;
   collecting first metadata based on sensed biological information of a first user and/or environmental information concerning the first user's surrounding environment, while the first content was reproduced on the first occasion; storing the first metadata;
   correlating one or more portions of the first content with one or more portions of the stored first metadata; and
   reproducing, on a second occasion, the correlated one or more portions of the first content in a reproducing mode whereby the reproducing mode adjusts one or more characteristics of the reproduced content depending on the one or more portions of the stored first metadata correlated with the one or more portions of the first content.

15. The computer-readable medium of claim 14, wherein the act of collecting comprises collecting the first metadata based on sensed biological information of the first user while the first content was reproduced on the first occasion.

16. The computer-readable medium of claim 14, wherein the act of collecting comprises collecting the first metadata based on environmental information concerning the first user's surrounding environment while the first content was reproduced on the first occasion.

17. The computer-readable medium of claim 14, wherein the act of correlating further comprises correlating the one or more portions of the first content with the one or more portions of the stored first metadata by using time stamps associated with the first content and the stored first metadata.

18. The computer-readable medium of claim 14, encoded with further instructions which, when executed by the processor, cause the processor to perform the further acts of:
   storing information that associates the first user with the stored first metadata;
   collecting second metadata based on sensed biological information of a second user and/or environmental information concerning the second user's surrounding environment, while the first content was reproduced on the first occasion;
   storing the second metadata; and
   distinguishing the stored first metadata from the stored second metadata.

19. The computer-readable medium of claim 14, encoded with further instructions which, when executed by the processor, cause the processor to perform the further acts of:
  storing information that associates the first metadata with the first content;
  reproducing second content on a second occasion;
  collecting second metadata based on sensed biological information of the first user or a second user and/or environmental information concerning the first or second user's surrounding environment, while the second content was reproduced on the second occasion;
  storing the second metadata; and
  distinguishing the stored first metadata from the stored second metadata.

* * * * *